Patented June 12, 1945

2,377,976

UNITED STATES PATENT OFFICE 2,377,976

CONTINUOUS SOLVENT EXTRACTION OF OIL FROM SEEDS

Philip A. Singer and Harold J. Deobald, Peoria, Ill., assignors to Allied Mills, Inc., a corporation of Indiana No Drawing. Application April 17, 1943, Serial No. 483,528

7 Claims. (Cl. 260—412.4)

This invention relates to the continuous solvent extraction of oil from seeds, and more particularly to the continuous use of isopropanol and ethanol in combination, as a solvent.

In our co-pending application, Serial No. 483,527, filed April 17, 1943, the use of a combined ethanol-isopropanol solvent for the extraction of oil from seeds and grains, particularly soy beans, is described and claimed. As there set forth, the combination of isopropanol and ethanol produces the valuable solvent features of both solvents and is not characterized by the difficulties which beset either ethanol or isopropanol when used alone. Optimum results are obtained with 70 to 80 parts of ethanol to 30 to 20 parts of isopropanol. The present invention is concerned with the use of such a solvent in a continuous process of extraction.

In the extraction of oil from soy beans, a solvent containing 75 parts of ethanol to 25 parts of isopropanol is preferred. This solvent may be used at atmospheric pressure, permits the separation of over 85% of the oil on cooling, and leaves an extracted soy bean flake containing only 0.3% to 0.5% of ether-extractable material. The separated and settled out oil from such a solvent is of the same high purity as oil obtained when using ethanol as a solvent. That is, it is equivalent to what is known in the trade as a "non-break oil" at 600° F. and has excellent color, flavor and odor. The meal is also of the same high purity and contains from 57% to 59% of protein when the flakes are produced from dehulled beans.

The solvent may be used on other seeds or grains, although the relative concentrations may be varied somewhat, depending upon the type of oil encountered. In the claims hereof the term "seed" is used to cover both seeds and grain.

The following describes a suitable process for the extraction of oil from soy beans:

The beans are cleaned, cracked, dried and flaked or they may be cleaned, cracked, flaked and then dried. No claim is made in connection with the preparation of the flake as this is more or less a standard practice. The prepared flake is now delivered to a suitable solvent extraction machine. This may be a machine which would involve batch-wise extraction or it may be a unit in which the extraction is carried on continuously in a counter current extractor, atmospheric pressure extraction being well adapted to continuous processes.

The flakes entering the extraction process should preferably contain not more than 3½% of moisture. This low moisture content of the flake does not bring about any dilution of the solvent so that rectification is not necessary. As a matter of fact, there is a possibility of a concentration of a solvent taking place rather than dilution.

The mixture of ethanol and isopropanol preferably is made up of the common inexpensive stable forms in which these solvents are commercially available, the ethanol being 95% by volume, and the isopropanol 91% by volume. The purity of the solvents used need not be necessarily those stated above, these being given to indicate a desirable alcoholic concentration, but alcohols of somewhat greater or less concentration may be used satisfactorily in our process. In operating our process we maintain temperatures slightly below the boiling point of the mixed solvent, that is, in the neighborhood of 170° F. when the 75–25 mixture is used.

The solvent extract leaving the extraction unit is cooled by any standard type of liquid-cooling device and reduced in temperature to about 80° F. or lower. On leaving the extraction unit the solvent extract when still hot is clear and amber in color. On cooling, the solution becomes turbid immediately because of separation of the oil in globules. On cooling, the oil globules are preferably separated by a positive means, preferably by centrifuging, but they may, if desired, be separated by mere settling. After separation, the solvent is brilliantly clear, and of a lighter specific gravity than the oil. The separated oil amounts to more than 85% of that present in the hot solvent extract. The separated oil is dried under vacuum, filtered with a small amount of diatomaceous earth or other suitable filter aid, and is ready for the market. This oil is brilliantly clear, bland in taste and odor, and is of such a high degree of purity that it is essentially non-break on heating to 600° F. The solvent removed from the oil during the period of drying is condensed and later reintroduced into the process.

The solvent extract from which the oil has been separated by cooling and centrifuging or settling, is predominantly reused under the present invention, but a small proportion thereof is bled from the system and subjected to purification processes. In practice it has been found with soy beans that more than 50% of the solvent may be so reused and not substantially more than 90%. Preferably the system is operated in reusing approximately 75% of the solvent extract and bleeding from the system approximately 25% thereof for distillation.

Soy beans contain, aside from small percentages of other materials, oil, various types of sugars, phosphatides, proteins, and ash. The fats, phosphatides, some of the carbohydrates, and ash, together with small amounts of other substances are soluble in the mixed solvent. The phosphatides are a valuable article of commerce and are known to the trade as soy-lecithin. In the operation of a hydrocarbon or a chlorinated hydrocarbon solvent plant the phosphatides remain with the oil and must be recovered by a rather complicated and expensive method. In the system described in application, Serial No. 483,527, filed April 17, 1943, the phosphatides are separated by the use of a salting out agent such as calcium chloride immediately after separation of the oil by cooling. In the present process, however, no attempt is made to separate the phosphatides from the solvent extract in the main body of solvent extract. It has been discovered that it is sufficient to remove these materials from the bleed portion of the solvent extract.

The bleed portion is, therefore, first treated with small quantities of calcium chloride, which may be dissolved in the solvent, and the phosphatides are thereby precipitated in a flocculent form. The salting out agent remains in solution and the phosphatide is precipitated in a relatively pure form. A suitable amount of calcium chloride is about one gram per pound of solvent extract. The precipitation is preferably carried on at room temperature. The phosphatide particles may be separated by settling, but it is preferred to employ more positive means such as a centrifuge. The phosphatides, after separation from the solvent extract, are dried under vacuum and the solvent distilled therefrom is recovered for future use. The recovered phosphatides constitute a merchantable product and require no further treatment except for certain special purposes.

After the separation of the phosphatides, the residual solvent extract is then distilled from the contained solids until the specific gravity of the solution is greater than that of the oil. On cooling, the oil comes to the surface and is easily drawn off. Residual solids are then further subjected to distillation to remove all traces of solvent. The oil, after separation, is dried under vacuum and filtered, and is ready for the market. The residue is essentially a carbohydrate syrup of great concentration and may be mixed with extracted meal or otherwise utilized. For example, it is suitable for use in fermentation processes. The residue contains sterols, ribo-flavin, thiamine, rare sugars, and other constituents which are present in the bean only in small quantities but are found in the residue in relatively concentrated form. These may be recovered by appropriate methods.

The redistilled solvent may be brought back into the system at any point, but in a continuous process it may suitably be introduced in such manner as directly to contact the soy bean flakes leaving the extraction process.

The recovered solvent is, however, preferably handled by a batch procedure in order that the relative proportions of ethanol and isopropanol may be more readily controlled and regulated.

The foregoing detailed description has been given for clearness of understanding only, and no unnecessary limitations should be understood therefrom.

We claim:

1. The method of continuously extracting oil from seeds which comprises contacting seeds at elevated temperature with a solvent consisting of a mixture of ethanol and isopropanol, in which the ethanol is from approximately 70 to 80 parts to 30 to 20 parts by volume of isopropanol, cooling the solvent extract whereby the bulk of the oil separates therefrom, freeing the solvent extract from the separated oil, supplying a major portion of the used solvent extract to fresh oil-containing seeds, bleeding from the system a minor proportion of at least 10% of the solvent extract, and supplying clean solvent extract as make-up.

2. The method as set forth in claim 1, in which the bleed portion is subjected to distillation, the distilled solvent recovered, and reintroduced to the system.

3. The method of continuously extracting oil from soy beans which comprises contacting soy beans at elevated temperature with a solvent consisting of a mixture of ethanol and isopropanol, in which the ethanol is from approximately 70 to 80 parts to 30 to 20 parts by volume of isopropanol, cooling the solvent extract whereby the bulk of the oil separates therefrom, substantially freeing the solvent extract from the separated oil, supplying a major portion of the used solvent extract to fresh oil-containing soy beans, bleeding from the system a minor proportion of at least 10% of the solvent extract, and supplying clean solvent extract as make-up to replace the bleed portion.

4. The method as set forth in claim 3, in which the bleed portion of the solvent extract is chemically treated to separate phosphatides therefrom, the separated phosphatides removed from the residual solvent extract, and the residual solvent extract then subjected to distillation to recover the solvent.

5. The method as set forth in claim 1, in which solvent is distilled from the bleed portion until the solvent extract has a higher specific gravity than the vegetable oil, the solvent extract is then cooled to separate substantially all of the vegetable oil therefrom, and the residual material is then subjected to further distillation substantially completely to remove the solvent.

6. The method as set forth in claim 3, in which the ratio of ethanol and isopropanol in the solvent is substantially within the range of 70 to 80 parts of ethanol to 30 to 20 parts of isopropanol, and in which the bleed is substantially 25% of the solvent extract.

7. The method of treating soy bean material which comprises contacting soy bean material with a solvent comprising approximately 75% ethanol and 25% isopropanol at a temperature slightly below boiling and at atmospheric pressure, maintaining the contact until substantially all of the oil has been extracted from the soy bean material, separating the solvent extract from the soy bean material, cooling the solvent extract whereby the bulk of oil separates therefrom, substantially removing the solvent extract from the separated oil, dividing the solvent extract into two portions, one portion consisting of approximately 75% and the other portion of approximately 25% of the solvent extract, reheating the larger portion and supplying it to fresh soy bean material, treating the smaller portion to remove phosphatide material therefrom, and then recovering the solvent from the non-phosphatide portion thereof.

P. A. SINGER.
H. J. DEOBALD.